United States Patent
Meraldi et al.

(10) Patent No.: US 6,527,997 B1
(45) Date of Patent: Mar. 4, 2003

(54) PROCESS OF MAKING CELLULOSE FORMATE FIBERS OF LIQUID CRYSTAL ORIGIN

(75) Inventors: Jean-Paul Meraldi, Zurich (CH); Vlastimik Cizek, Zurich (CH); Jean-Claude Aubry, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 154 days.

(21) Appl. No.: 09/620,455

(22) Filed: Jul. 20, 2000

Related U.S. Application Data

(62) Division of application No. 09/368,874, filed on Aug. 5, 1999, now Pat. No. 6,139,959, which is a continuation of application No. PCT/EP98/00537, filed on Feb. 2, 1998.

(30) Foreign Application Priority Data

Feb. 6, 1997 (FR) ............................................. 97 01527

(51) Int. Cl.$^7$ .................................................. D01F 2/28
(52) U.S. Cl. ................... 264/187; 264/178 F; 264/203; 264/211.14; 264/233
(58) Field of Search ............................ 264/178 F, 187, 264/203, 211.14, 233

(56) References Cited

U.S. PATENT DOCUMENTS

| | | | |
|---|---|---|---|
| 4,839,113 A | 6/1989 | Villaine et al. | |
| 5,593,487 A | 1/1997 | Meraldi et al. | |
| 5,880,278 A | 3/1999 | Huston et al. | |
| 6,093,490 A | * | 7/2000 | Meraldi et al. ............. 428/393 |

FOREIGN PATENT DOCUMENTS

| WO | WO 9520629 | 8/1995 |
|---|---|---|
| WO | WO 9702292 | 1/1997 |
| WO | WO-9706294 A1 * | 2/1997 |

* cited by examiner

*Primary Examiner*—Leo B. Tentoni
(74) *Attorney, Agent, or Firm*—Baker Botts L.L.P.

(57) ABSTRACT

A cellulose formate fiber of liquid-crystal origin, having a high elongation at break and having the following characteristics:

a) under an optical polarizing microscope, its filaments have a banded structure typical of its liquid-crystal origin;

b) it satisfies the following relationships:
$DS \geq 2$; $Ar \geq 8$; $Te < 45$; $Mi > 500$; $Er > 10$, DS being the degree of substitution of the cellulose with formate groups in the fiber (in %), Ar the elongation at break (in %) of the fiber, Te its tenacity (in cN/tex), Mi its initial modulus (in cN/tex) and Er its energy at break (in J/g).

Also, a process for obtaining this cellulose formate fiber by "dry-jet-wet-spinning" of a liquid-crystal solution of cellulose formate, in which water is used as coagulating agent. A fiber of cellulose regenerated from cellulose formate which itself has a high value of elongation at break, and a process for obtaining this fiber.

10 Claims, No Drawings

PROCESS OF MAKING CELLULOSE FORMATE FIBERS OF LIQUID CRYSTAL ORIGIN

This application is a divisional of Ser. No. 09/368,874, filed Aug. 5, 1999, now U.S. Pat. No. 6,139,959, which is a continuation of PCT EP 98/00537, filed Feb. 2, 1998.

BACKGROUND OF THE INVENTION

The present invention relates to cellulose formate fibers and to fibers of cellulose regenerated from this formate, and also to processes for obtaining such fibers when they are used starting from liquid-crystal solutions of cellulose formate, i.e. of solutions having a high concentration of polymer.

Liquid-crystal solutions of polymers, in the field of spinning, are used in known manner for obtaining what are called "technical" fibers having very high properties of tenacity and of tensile modulus, combined with low elongations at break, as has been shown in particular by patents U.S. Pat. No. 3,767,756, which relates to aramid fibers, or U.S. Pat. No. 4,746,694, which relates to aromatic polyester fibers. The spinning of liquid-crystal solutions based on cellulose also makes it possible to obtain cellulose fibers having high mechanical properties, as described, for example, in International Patent Application PCT/CH85/00065, published under the number WO 85/05115.

This application WO 85/05115, or equivalent patents EP-B-179 822 and U.S. Pat. No. 4,839,113, disclose obtaining liquid-crystal solutions of cellulose formate by reacting cellulose with formic acid and phosphoric acid. These solutions may be spun using what is called the "dry-jet-wet spinning" technique to obtain cellulose formate fibers, as well as regenerated cellulose fibers after regeneration treatment of these formate fibers. Compared with conventional cellulose fibers such as rayon or viscose fibers, spun from non-liquid-crystal solutions, the fibers described in WO 85/05115 are characterized, owing to the liquid-crystal nature of the spinning solutions from which they have originated, by a far more ordered or oriented structure, and hence by a substantially greater strength and modulus: their tenacities may vary, for example, from 50–60 cN/tex to 80–100 cN/tex, or even more, depending on whether they are formate fibers or fibers of cellulose regenerated from this formate, their initial moduli possibly attaining 3000 to 3500 cN/tex; their values of elongation at break, in return, are low, of the order of 3% to 4%.

To obtain these high-strength, high-modulus fibers, the coagulation step is performed in acetone. Now, acetone is a relatively costly, volatile product, which furthermore involves a risk of explosion which requires special safety measures. Such disadvantages are not peculiar to acetone, but common, at least for some of them, to numerous organic liquids used in the spinning industry, in particular as coagulating agents.

It was therefore entirely desirable to find an alternative to the use of acetone by replacing this acetone with a coagulating agent which would be more advantageous from an industrial point of view and easier to use, even at the expense of a reduction in the mechanical properties described previously.

It turns out that simply replacing acetone with water in the spinning process according to the aforementioned application WO 85/05115 results in fibers having very poor mechanical properties and which are of no real industrial interest: firstly their tenacity is clearly insufficient to meet "technical" applications (such as for reinforcing pneumatic tires), and secondly their elongation at break is too poor for "textile" applications (for example in the clothing industry), which require high values of elongation at break.

SUMMARY OF THE INVENTION

Applicants have discovered during their research that it was possible to obtain, due to a novel, specific spinning process, a cellulose formate fiber meeting the requirements of textile application, i.e. having a high elongation at break of at least 8%. This specific spinning process, used starting with the liquid-crystal solutions based on cellulose formate described previously, uses-water as a coagulating agent, and not acetone: it is therefore particularly advantageous.

Thus, it is henceforth possible, starting from the same liquid-crystal solutions based on cellulose formate, and modifying the nature of the coagulating agent, to obtain either technical fibers of high mechanical strength by coagulation in acetone, or textile fibers of high elongation at break by coagulation in water. The existence of these two complementary methods specifies the field of industrial application of the base invention described in the aforementioned application WO 85/05115.

Consequently, a first object of the invention is a cellulose formate fiber of liquid-crystal origin, characterized by the following properties:

a) under an optical polarizing microscope, its filaments have a banded structure typical of its liquid-crystal origin;

b) it satisfies the following relationships:
DS$\geq$2; Ar$\geq$8; Te<45; Mi>500; Er>10, DS being the degree of substitution of the cellulose with formate groups in the fiber (in %), Ar the elongation at break (in %) of the fiber, Te its tenacity (in cN/tex), Mi its initial modulus (in cN/tex) and Er its energy at break (in J/g).

Preferably, the elongation at break Ar is at least 10%, more preferably still at least 12%.

This combination of properties is quite unexpected for a cellulose formate fiber of liquid-crystal origin, because the highly ordered nature of the initial liquid-crystal solutions is a priori incompatible with a fiber, the elongation at break of which may achieve values of 8 to 12%, no document of the prior art furthermore describing a cellulose formate fiber of liquid-crystal origin having an elongation at break which exceeds values of 4 to 4.5%.

The invention also relates to a process for obtaining the above cellulose formate fiber, by spinning and coagulation in water of a liquid-crystal solution of cellulose formate using what is called the "dry-jet-wet-spinning" method, this process being characterized in that it comprises the following steps:

a) the starting point is a solution of cellulose formate in at least one phosphoric acid, this solution being optically anisotropic at ambient temperature and at rest;

b) this solution is extruded through a spinneret at a temperature (Tf) such that the solution is optically anisotropic if it is at rest;

c) the solution thus extruded is then stretched through a non-coagulating layer, preferably air;

d) then, by passing through coagulation means, the solution thus stretched is coagulated in water, the temperature (Tc) of which is greater than 5° C., the tensile stress ($\sigma_c$) to which the fiber is subjected upon emerging from the coagulation means being kept at a value of less than 5 cN/tex;

e) the fiber thus formed is washed, and may possibly be dried.

Preferably, the concentration of cellulose formate in the spinning solution is at least 16%, more preferably equal to or greater than 22% (% by weight). Such concentrations, which are unusual for spinning cellulose fibers for textile purposes, such as viscose fiber, for example, are particularly advantageous in that they make it possible to reduce the quantity of solvent in the spinning solution; furthermore, they make it possible to use the spinning process of the invention at particularly high speeds.

The cellulose formate fiber of the invention may be used as the precursor of a regenerated cellulose fiber which forms another object of the invention.

The invention relates in particular to a fiber of cellulose regenerated from cellulose formate, of liquid-crystal origin, having itself a high elongation at break: this fiber is characterized by the following properties:

a) under an optical polarizing microscope, its filaments have a banded structure typical of its liquid-crystal origin;

b) it satisfies the following relationships:
  $0<DS<2$; $AR \geq 8$; $TE<45$; $MI>500>10$, DS being the degree of substitution of the cellulose with formate groups in the fiber (in %) AR the elongation at break (in %) of the fiber, TE its tenacity (in cN/tex), its initial modulus MI (in cN/tex) and ER its energy at break (in J/g).

The invention also relates to a process for obtaining the above regenerated cellulose fiber, comprising the following steps:

a) the starting point is a cellulose formate fiber according to the invention;

b) this formate fiber is treated by passing through regeneration means, washing means and then drying means, such that the tensile stresses ($\sigma_r$) to which the fiber is subjected at the entry to each of said means are less than 5 cN/tex.

The invention also relates to the use of the fibers of the invention in the field of textiles, in particular in clothing or furnishing, these fibers possibly being, for example, in the state of woven or non-woven, or knitted continuous fibers, or in the state of short fibers (staple fibers).

The invention, and its advantages, will be readily understood with reference to the description and the non-limitative embodiments which follow.

DESCRIPTION OF PREFERRED EMBODIMENT

I. MEASUREMENTS AND TESTS USED

I-1. Degree of Polymerization

The degree of polymerization is referred to as DP. The DP of the cellulose is measured in known manner, this cellulose being in powder form or being converted beforehand into powder.

The inherent viscosity (IV) of the dissolved cellulose is first determined according to Swiss Standard SNV 195 598 of 1970, but at different concentrations which vary between 0.5 and 0.05 g/dl. The inherent viscosity is 'defined by the equation:

$$IV=(1/C_e) \times Ln(t_l/t_O)$$

in which $C_e$ represents the concentration of dry cellulose, $t_l$ represents the duration of flow of the dilute polymer solution, $t_O$ represents the duration of flow of the pure solvent, in a Ubbelohde-type viscosimeter, and Ln represents the Naperian logarithm. The measurements are taken at 20° C.

The intrinsic viscosity $[\eta]$ is then determined by extrapolation of the inherent viscosity IV to zero concentration.

The average molecular weight $M_w$ is given by the Mark-Houwink equation:

$$[\eta]=K \times M_w^\alpha$$

in which the constants K and $\alpha$ are, respectively: $K=5.31 \times 10^{-4}$; $\alpha=0.78$, these constants corresponding to the solvent system used to determine the inherent viscosity. These values are given by L. Valtasaari in the document Tappi 48, 627 (1965).

The DP is finally calculated according to the formula:

$$DP=(M_w)/162,$$

162 being the molecular weight of the elementary cellulose unit.

When the DP of the cellulose is being determined from cellulose formate in solution, this formate must first of all be isolated, and the cellulose then regenerated.

One then proceeds as follows: the solution is first of all coagulated with water in a dispersing machine. After filtration and washing with acetone, a powder is obtained which is then dried in an oven under vacuum at 40° C. for at least 30 minutes. After the formate has been isolated, the cellulose is regenerated by treating this formate at reflux with normal sodium hydroxide. The cellulose obtained is washed with water and dried and the DP is measured as described above.

I-2. Degree of Substitution

The degree of substitution of the cellulose with cellulose formate is also referred to as the degree of formylation.

The degree of substitution determined by the method described here gives the percentage of alcohol functions in the cellulose which are esterified, that is to say converted into formate groups. This means that a degree of substitution of 100% is obtained if the three alcohol functions in the cellulose unit are all esterified, or that a degree of substitution of 30%, for example, is obtained if 0.9 alcohol functions out of three, on average, are esterified.

The degree of substitution is measured differently depending on whether the characterization is being made on cellulose formate (formate in solution or formate fibers) or fibers of cellulose regenerated from cellulose formate.

I-2.1. Degree of Substitution on Cellulose Formate:

If the degree of substitution is measured on cellulose formate in solution, this formate is first isolated from the solution as indicated above in paragraph I-1. If it is measured on formate fibers, these fibers are first cut into pieces 2 to 3 cm in length.

200 mg of cellulose formate thus prepared are weighed out accurately and are introduced into a conical flask. 40 ml of water and 2 ml of normal sodium hydroxide (1N NaOH) are added. The mixture is heated to 90° C. at reflux for 15 minutes under nitrogen. The cellulose is thus regenerated by reconverting the formate groups into hydroxyl groups. After cooling, the excess sodium hydroxide is back-titrated with decinormal hydrochloric acid solution (0.1N HCl) and the degree of substitution is thus deduced therefrom.

I-2.2. Degree of Substitution on Regenerated Cellulose Fibers:

About 400 mg of fibers are cut into pieces 2 to 3 cm long, then weighed out accurately and introduced into a 100 ml conical flask containing 50 ml of water. 1 ml of normal sodium hydroxide (1N NaOH) is added. The mixture is stirred at ambient temperature for 15 minutes. The cellulose is thus regenerated completely by converting into hydroxyl groups the last formate groups which had withstood the regeneration carried out, after spinning them, directly on continuous fibers. The excess sodium hydroxide is titrated with decinormal hydrochloric acid solution (0.1N HCl) and the degree of substitution is thus deduced therefrom.

In the present description, the degree of substitution is referred to as DS when it is measured on fibers, whether these be fibers of cellulose formate or fibers of cellulose regenerated from this formate.

I-3. Optical Properties of the Solutions

The optical isotropy or anisotropy of the solutions is determined by placing a drop of test solution between the linear crossed polarizer and analyzer of an optical polarizing microscope (Olympus type BH2), followed by observing this solution at rest, that is to say in the absence of dynamic stress, at ambient temperature.

In known manner, an optically anisotropic solution, also referred to as a liquid-crystal solution, is a solution which depolarizes light, that is to say, when thus placed between the linear crossed polarizer and analyzer, permits transmission of light (colored texture). An optically isotropic solution is a solution which, under the same conditions of observation, does not have the above property of depolarization, the field of the microscope remaining black.

I-4. Mechanical Properties of the Fibers

The term "fibers" is understood here to refer to multifilament fibers (also referred to as "spun yarns"), formed in known manner of a large number of elementary filaments. All the mechanical properties below are measured on fibers which have undergone preconditioning. The term "preconditioning" is understood to refer to the storage of the fibers, before measurement, under a standard atmosphere according to European Standard DIN EN 20139 (temperature of 20±2° C.; humidity of 65±2%) for at least 24 hours. For cellulose fibers, such preconditioning makes it possible to stabilize their moisture content at an equilibrium level of less than 15% by weight of dry fiber.

The linear density of the fibers is determined on at least three samples, each corresponding to a length of 50 m, by weighing this length of fiber. The linear density is given in tex (weight in grams of 1000 m of fiber).

The mechanical properties in extension (tenacity, initial modulus, elongation and energy at break) are measured, in known manner, using a Zwick GmbH & Co (Germany) 1435-type or 1445-type tension machine. After receiving a low prior protective twist (helical angle of about 6°), the fibers undergo tension over an initial length of 400 mm, at a nominal speed of 200 mm/min. All the results given are an average of 10 measurements.

The tenacity (breaking load divided by linear density) and the initial modulus are indicated in cN/tex (centinewtons per tex—it will be recalled that 1 cN/tex is equal to approximately 0.11 g/den (grams per denier)). The initial modulus is defined as the slope of the linear part of the forceelongation curve, which occurs just after a standard pretension of 0.5 cN/tex. The elongation at break is indicated as a percentage. The energy at break is given in J/g (joules per gram), that is to say, by unit of weight of fiber.

I-5. Optical Properties of the Fibers

For detecting and observing the banded structure of the fibers, there is used an optical polarizing microscope identical to that used for studying the solutions (see §I-3 above), by placing filaments of the fiber between the crossed polarizer and analyzer. To facilitate detection of the banded structure, the filaments are preferably placed in a position close to the extinction.

In conventional manner, each filament to be tested is placed on a glass slide, impregnated with a liquid of an index appropriate for cellulose, and then the whole is covered with a cover slip. The filament is observed as it is, by transparency, at a magnification of 200 to 1000. A magnification of 400 is highly suitable in the majority of cases. For magnifications of 1000, an immersion lens is used in known manner, which requires the deposition of an immersion liquid on the cover slip before the lens is brought into position.

II. CONDITIONS OF CARRYING OUT OF THE INVENTION

First of all, the production of the spinning solutions will be described, then the spinning of these solutions to obtain fibers of cellulose formate. In a third paragraph, there is described the regeneration of the cellulose formate fibers for obtaining fibers of cellulose regenerated from the formate.

II-1. Preparation of the Spinning Solutions

The cellulose formate solutions are prepared by mixing cellulose, formic acid and phosphoric acid or a liquid based on phosphoric acid, as indicated, for example, in application WO 85/05115 referred to above.

The cellulose may be in various forms, in particular in the form of a powder, prepared for example by pulverizing a cellulose plate in the raw state. Preferably, its initial water content is less than 10% by weight, and its DP is between 500 and 1000.

The formic acid is the esterification acid, the phosphoric acid (or the liquid based on phosphoric acid) being the solvent of the cellulose formate, referred to as "solvent" or alternatively as "spinning solvent" in the description hereafter. In general, the phosphoric acid used is orthophosphoric acid ($H_3PO_4$), but other phosphoric acids, or a mixture of phosphoric acids, may be used. The phosphoric acid may, depending on the case, be used in solid form, in liquid state or alternatively dissolved in the formic acid.

Preferably, the water content of these two acids is less than 5% by weight; they may be used alone, or may possibly contain, in small proportions, other organic and/or inorganic acids, such as acetic acid or sulphuric acid, for example.

In accordance with the description given in the aforementioned application WO 85/05115, the cellulose concentration of the solution, referred to as "C", may vary to a large extent, for example between 10% and 30%; this concentration C is the percentage by weight of cellulose relative to the total weight of the solution, calculated on the basis of a nonesterified cellulose. The weight ratio (formic acid/phosphoric acid) may also be adjusted within a wide range.

When producing the cellulose formate, the use of formic acid and of phosphoric acid makes it possible to obtain both a high degree of substitution of cellulose formate, generally greater than 20%, without excessively reducing the initial degree of polymerization of the cellulose, as well as a homogenous distribution of these formate groups, both in the amorphous zones and in the crystalline zones of the cellulose formate.

The appropriate kneading means for obtaining a solution are known to the person skilled in the art: they must be capable of correctly pugging and kneading, preferably at a controllable speed, the cellulose and the acids until the solution is obtained. "Solution" is understood here, in known manner, to mean a homogenous liquid composition in which no solid particle is visible to the naked eye. The kneading can be carried out, for example, in a mixer comprising Z-shaped arms or in a mixer with a continuous screw. These kneading means are preferably equipped with a device for evacuation under vacuum and with a heating and cooling device which makes it possible to adjust the temperature of the mixer and its contents, in order to accelerate, for example, the dissolving operations, or to control the temperature of the solution during formation.

By way of example, the following operating method can be used:

A mixture of orthophosphoric acid (99% crystalline) and formic acid, containing for example about three-quarters of orthophosphoric acid to one quarter of formic acid (parts by weight), is introduced into a dual-casing mixer, comprising Z-shaped arms and an extrusion screw. Then powdered cellulose is added, the moisture content of which is in equilibrium with the ambient air humidity. The entire batch is mixed for a period of about 1 to 2 hours, for example, the temperature of the mixture being kept between 10 and 20° C. until a solution is obtained.

The spinning solutions thus obtained are ready for spinning, and can be transferred directly, for example by means of an extruder screw placed at the mixer outlet, to a spinning machine in order to be spun thereon, without any prior transformation other than usual operations such as degassing or filtration stages, for example.

The spinning solutions used for carrying out the invention are optically anisotropic solutions. Preferably, these solutions have at least one of the following characteristics (% by weight):

- their cellulose concentration "C" lies within a range from 16% to 26%, and their total formic acid concentration "F" (that is to say, the portion of formic acid consumed for esterification plus the portion of free formic acid remaining in the final solution) lies within a range from 8% to 20%;
- the degree of substitution of the cellulose, in solution, is greater than 20%;
- the DP of the cellulose in solution is between 300 and 900;
- they contain less than 10% water.

More preferably, these spinning solutions have at least one of the following characteristics:

- C is equal to, or even more preferably greater than, 22%, and F is greater than 10%;
- the degree of substitution of the cellulose, in solution, is between 30% and 45%;
- the DP of the cellulose in solution is between 350 and 600.

II-2. Spinning of the Solutions

The general case of the spinning of a multi-filament fiber, i.e. a fiber composed of a plurality of elementary filaments, will be considered here.

The spinning solutions are spun using what is called the "dry-jet-wet-spinning" technique: this technique uses a non-coagulating fluid layer, generally air, placed at the outlet from the spinneret, between the spinneret and the coagulation means.

On emerging from the kneading and dissolving means, the solution is transferred towards the spinning block where it feeds a viscose pump. From this viscose pump, the solution is extruded through at least one spinneret, preceded by a filter. During its conveyance to the spinneret, the solution is gradually brought to the desired spinning temperature, which is generally between 30° C. and 80° C., according to the nature of the spinning solutions, this temperature being selected such that the solution is optically anisotropic if it is at rest.

Thus, "spinning temperature", Tf, is understood to mean the temperature of the spinning solution at the moment that it is extruded through the spinneret. Preferably, Tf lies within a range from 40° C. to 60° C.

Each spinneret may comprise a variable number of extrusion capillaries, this number possibly varying, for example, from 50 to 2000, or even more. It is also possible, to increase the linear density of the fiber, to use a plurality of spinnerets arranged in parallel in one and the same spinning head. The capillaries are generally of cylindrical shape, their diameter possibly varying, for example, from 50 to 100 $\mu m$ (micrometers), but their cross-section may be adapted in known manner to impart different shapes to the shaped filaments.

On leaving the spinneret, therefore, a liquid extrudate is obtained, formed of a variable number of elementary liquid veins. Each elementary liquid vein is stretched (see spin-stretch factor below) in a non-coagulating fluid layer, before penetrating into the coagulation zone. This non-coagulating fluid layer is preferably air (hence the name "air gap"), the thickness Ag of which may vary from several mm to several tens of mm (millimeters), for example from 5 mm to 35 mm; in known manner, "thickness Ag of the non-coagulating layer" is understood to mean the distance between the lower face of the spinneret, arranged horizontally, and the entry to the coagulation zone (surface of the coagulating liquid).

After passing through the non-coagulating layer, all the liquid veins thus stretched penetrate into the coagulation zone and come into contact with the coagulating agent (or coagulating medium). Under the action of the latter, they are transformed, by precipitation of the cellulose formate and extraction of the spinning solvent, into solid filaments of cellulose formate which thus form a fiber.

According to the invention, the coagulating agent used is water.

Advantageously, this coagulation water does not contain any additive, with the possible exception of a surfactant.

The temperature, Tc, of the coagulating medium is a critical parameter for carrying out the invention: it must be greater than +5° C.; preferably, Tc is selected to be greater than 10° C., more preferably greater than 15° C.

It has been observed that low temperatures close to 5° C., for example between 5° C. and 10° C., could in some cases result in certain filaments sticking together during their formation ("married filaments"). This upsets the spinning operations and is generally detrimental to the quality of the spun yarn obtained; the addition of a surfactant, for example isopropanol, or a soap, for example a phosphate-based soap, is one possible solution for eliminating, or at least reducing, the above difficulties.

The person skilled in the art will be able to adjust the temperature of the coagulating medium according to the particular characteristics of the spun solution and the mechanical properties desired, by means of simple optimization tests. Generally, the temperature Tc may be selected to be higher, the higher the concentration C of the spinning solution itself.

The amount of spinning solvent (or more generally of a compound forming part of the initial spinning solution) which is naturally provided by the solution in the coagulating agent, during coagulation, is not a critical parameter of the process, and may vary, depending on the particular conditions of implementation of the invention, from several % to 10–15%, or even more (% by total weight of coagulating agent).

The coagulation means to be used are known devices, containing the coagulating medium and in which the fiber being formed circulates. Preferably a bath located beneath the spinneret is used, at the exit from the non-coagulating layer, this bath being generally extended at its base by a vertical cylindrical tube, referred to as "spinning tube", in which the coagulated fiber passes and the coagulating medium also circulates.

The total depth of coagulating agent (Pc) through which the filaments pass during formation in the coagulation bath, measured from the entry to the bath to the entry to the spinning tube, may vary within a wide range, for example from 10 mm to 40 mm, or even more. Nevertheless, depending on the particular geometries of the coagulation baths used, it has been noted that a low depth of coagulating agent might also in certain cases involve the formation of "married filaments"; thus, preferably, this depth Pc is selected to be greater than 10 mm, more preferably at least equal to 20 mm.

During the coagulation phase, one endeavors to keep the tensions to which the fiber is subjected at as low a level as possible, given that the tensile stress ($\sigma_c$) to which the fiber is subjected at the outlet from the coagulation means must be less than 5 cN/tex. Preferably, the stress $\sigma_c$ is kept at a value of less than 2 cN/tex.

In known manner, this stress $\sigma_c$ is the complex resultant of numerous parameters among which mention may be made of the viscosity of the spinning solution and hence of its cellulose concentration C, the spinning temperature Tf, the thickness Ag of the non-coagulating layer, the depth Pc of coagulating medium in the coagulation bath, the spinning speed and the geometry of this bath. The person skilled in the art will be able to adjust these different parameters in order to keep cc below 5 cN/tex. Known tensiometers which are capable of operating in particular in liquid media are used to monitor these tensions.

On leaving the coagulation means, for example after a horizontal deflection point, the fiber is sent to washing means and taken up onto a drive device, for example onto motorized cylinders. The speed of the spun product, on this drive device, is referred to as the "spinning speed" (or alternatively feed speed or drive speed) and referenced Vf: it is the speed of passage of the fiber through the spinning installation once the fiber has been formed.

The ratio between the spinning speed and the extrusion speed of the solution through the spinneret defines what is called, in known manner, the spin-stretch factor (abbreviated to FEF), which is for example in the present case generally between 2 and 10.

Once coagulated, the fiber has to be washed until it is neutral. "Neutral washing" is understood to mean any washing operation making it possible to extract all or virtually all the spinning solvent from the fiber. This operation is advantageously carried out with water, a natural swelling medium for cellulose. The temperature of the washing water is not a critical parameter of the process: it is possible to use water at ambient temperature (for example 15° C. to 20° C.) or at a higher temperature if necessary to improve the washing kinetics. Known washing means may be used, consisting, for example, of baths or booths containing the washing water and in which the fiber to be washed circulates. The washing times may typically vary from several seconds to several tens of seconds, depending on the particular conditions of implementation of the invention.

After washing, the cellulose formate fiber is dried in known manner by any suitable means. It is possible to operate, for example, by passing the fiber continuously over heating rollers; preferably, a drying temperature of less than 200° C., for example from 150 to 190° C., is used.

Advantageously, the process of the invention may be carried out within a very wide range of spinning speeds, which may vary, for example, from 50 to 150 m/min or even more.

If it is desired to characterize or use the cellulose formate fiber as such, that is to say, not to regenerate the cellulose, the washing stage is preferably performed such that the amount of residual spinning solvent in the finished, i.e. washed and dried, fiber does not exceed 0. 1% to 0.2% by weight, relative to the weight of dry fiber.

It is also possible to send the cellulose formate fiber thus spun, dried or non-dried, directly to the means of regeneration, in line and continuously, with the aim of preparing a fiber of cellulose regenerated from cellulose formate.

II-3. Regeneration of the Formate Fibers

"Fiber of cellulose regenerated from cellulose formate" is understood here to mean a fiber, the degree of substitution of which with formate groups (DS) is between 0 and 2%, that is to say that the molecule of cellulose has had virtually all its substituent formate groups removed.

A regeneration process consists in known manner of treating the cellulose-derivative fiber in a regenerating medium, generally an aqueous sodium hydroxide solution, then washing the fiber thus regenerated, then drying it, these three operations being carried out, in principle, continuously on one and the same treatment line, referred to as "regeneration line".

The regeneration process according to the invention for obtaining a fiber of regenerated cellulose according to the invention having a high elongation at break, equal to or greater than 8%, comprises the following steps:

a) the starting point is a cellulose formate fiber according to the invention;

b) then the formate fiber is treated by passing it through regeneration means, washing means and then drying means, such that the tensile stress ($\sigma_r$) to which the fiber is subjected at the entry to each of said means is less than 5 cN/tex.

This process of the invention is preferably carried out with an aqueous sodium hydroxide solution, the concentration of sodium hydroxide Cs of which is at most 5% or at least equal to 16% (% by weight), because between 5% and 16% by weight of sodium hydroxide, it has in fact been noted that the filaments of the cellulose formate fibers might in certain cases be subject to partial surface dissolution during regeneration: such dissolution, which may result in particular in the presence of married filaments, may be detrimental to the mechanical properties of the fiber, or to the later use thereof.

The regeneration line consists in conventional manner of regeneration means, followed by washing means, which themselves are followed by drying means. All these devices are not critical for carrying out the invention. The regeneration and washing means may consist in particular of baths, pipes, tanks or booths in which the regenerating medium or the washing medium circulates. It is, for example, possible to use booths each equipped with two motor-driven cylinders around which the fiber to be treated is wound, this fiber then being sprayed with the liquid medium used (regenerating or washing).

The dwell times in the regeneration means will of course have to be adjusted so as to regenerate the formate fibers sufficiently and thus to satisfy the following relationship on the final fiber of regenerated cellulose:

$$0 < DS < 2.$$

The person skilled in the art will be able to adjust these dwell times which, depending on the particular conditions of implementation of the invention, may vary, for example, from 1 to 2 seconds to about 10 to 20 seconds.

By convention, according to the present invention, a fiber the cellulose of which is only partially regenerated, having for example a DS of 2% to 10%, falls within the category of cellulose formate fibers.

The washing medium is preferably water, as for the spinning, used at ambient temperature or at a higher temperature, if necessary, to increase the washing kinetics. A neutralizing agent for the sodium hydroxide which has not been consumed may possibly be added to this washing water.

The drying means consist, for example, of ventilated heating tunnels through which the washed fiber circulates, or alternatively heating cylinders on which the fiber is wound. The drying temperature is not critical, and may vary within a wide range from, for example, 100° C. to 200° C., depending on the particular conditions of implementation of the invention, in particular depending on the passage speeds on the regeneration line. Preferably a temperature of less than 200° C. is used, for example from 150° C. to 190° C. On emerging from the drying means, the fiber is taken from a takeup spool, and the residual moisture content thereof is monitored. Preferably, the drying conditions (temperature and duration) are adjusted such that the residual moisture content is between 10% and 15% by weight of dry fiber.

Typically, the necessary washing and drying times vary from several seconds to several tens of seconds, depending on the means used and the particular conditions of implementation of the invention.

During passage across the regeneration line, tensions which are as low as possible are used, such that the tensile stress $\sigma_r$ to which the fiber is subjected at the entry to each of the regeneration, washing and then drying means is less than 5 cN/tex. Since the tensions are difficult to measure inside these different means, it is preferred to monitor them at the entry to these means, using suitable tensiometers.

According to the invention, the tensile stresses $\sigma_r$ at the entry to each of the regeneration, washing and drying means are preferably kept at a level lower than 2 cN/tex. Under real-life industrial conditions, and in particular for high regeneration speeds, the lower limits of these tensile stresses are located generally around 0.1 to 0.5 cN/tex, lower values being unrealistic from an industrial point of view, and even undesirable for the stability of the process and of the product.

The regeneration speed (Vr), that is to say, the speed of passage of the fiber across the regeneration line, may vary within a wide range, for example from 50 m/min to 150 m/min, or even more.

The process for obtaining regenerated cellulose fibers of the invention is preferably carried out in line and continuously with the spinning process, such that the entire chain of manufacture, from extrusion of the solution through the spinneret to drying of the regenerated fiber, is uninterrupted.

III. EXAMPLES OF EMBODIMENT

The following examples, whether or not in accordance with the invention, are examples of the production of cellulose formate fibers, or fibers of cellulose regenerated from cellulose formate; these fibers have all originated from liquid-crystal solutions of cellulose formate prepared in accordance with the description of Section II above.

III-1. Fibers According to the Invention

III-1.1. Cellulose Formate Fibers (Table 1):

A total of 27 spinning tests are carried out on cellulose formate fibers, in accordance with the spinning process of the invention and the details given in paragraphs II-1 and II-2 above, from 11 different spinning solutions (solutions referenced from A to K).

Table 1 shows both the particular conditions of carrying out the process of the invention, and the properties of the fibers obtained.

The abbreviations and the units used in this Table 1 are as follows:

Test No.: Number of the spinning test and of the corresponding fiber (referenced A-1 to K-1);

C: cellulose concentration in the spinning solution (% by weight);

F: concentration of total formic acid in the no spinning solution (% by weight);

P: concentration of phosphoric acid in the spinning solution (% by weight);

Tf: spinning temperature (in ° C.);

Ag: thickness of the non-coagulating layer of air (in mm);

Tc: temperature of the coagulating medium (in ° C.);

$\sigma_c$: tensile stress to which the fiber is subjected at the outlet from the coagulation means (in cN/tex);

Vf: spinning speed (in m/min);

Ti: linear density of the fiber (in tex);

Te: tenacity of the fiber (in cN/tex);

Ar: elongation at break of the fiber (in %);

Mi: initial modulus of the fiber (in cN/tex);

Er: energy at break of the fiber (in J/g);

DS: degree of substitution of the cellulose with formate groups, in the fiber (in %).

In these different spinning tests, the use of the same letter (for example A) for different fibers indicates that these fibers were obtained from the same solution: the 4 fibers A-1 to A-4, for example, were spun from the same spinning solution (A) of concentrations C=22%, F=18% and P=60%, by varying the different spinning parameters (Tf, Ag, Tc, . . . ).

To perform these tests, in particular the special conditions below are used:

the 11 spinning solutions are prepared from powdered cellulose (initial water content equal to about 8% by weight, DP of between 500 and 600), formic acid and orthophosphoric acid each containing about 2.5% by weight of water;

all these solutions are optically anisotropic, and contain a total of less than 10% water (% by weight);

the spinnerets comprise 250 capillaries of cylindrical shape, of a diameter of 50 or 65 μm, except in test J, wherein a spinneret of 200 capillaries is used;

the values of Tf are included in a range from 40° C. to 60° C.;

the values of FEF vary from 4 to 9 approximately;

the coagulation water does not contain any additive, with the possible exception of a surfactant (for example, isopropanol for tests D-1 and D-2);

the amount of phosphoric acid in the coagulating medium is stabilized at a level of less than 5% (% by weight);

the washing water is an industrial water at a temperature close to 15° C.;

the fiber is dried by passing over heating cylinders at a temperature of 180° C.;

on the finished fiber, i.e. the washed and dried fiber, the amount of residual phosphoric acid is less than 0.1% (% by weight of dry fiber).

The DP of the cellulose in the spinning solutions is between 400 and 450, which demonstrates in particular low depolymerization after dissolving.

The degree of substitution of the cellulose in the solutions is on average between 30 and 50% for solutions containing 16% to 22% by weight of cellulose, and between 20% and 30% for more concentrated solutions (more than 22% by weight cellulose).

All the mechanical properties indicated in Table 1 are average values calculated over 10 measurements, with the exception of the linear density (average of 3 measurements), the standard deviation over the average (in % of this average) being generally between 1 and 2.5%.

On reading Table 1, it will be noted that all the fibers satisfy the following relationships:

$DS \geq 2; Ar \geq 8; Te<45; Mi>500; Er>10.$

The values of DS lie between 20% and 45%; in practice, they are virtually identical to the degrees of substitution measured on the corresponding spinning solutions.

It will furthermore be noted that these cellulose formate fibers for the most part satisfy the following preferred relationships:

$Ar \geq 10, Te \geq 25; Mi \geq 1000; Er \geq 15.$

More preferably, they satisfy at least one of the following relationships:

$Ar \geq 12; Te \geq 30; Mi \geq 1200; Er \geq 20.$

In the majority of the examples of Table 1, the filament linear density (linear density of the fiber Ti divided by the number of filaments) is equal to about 2.2 dtex (decitex). However, this linear density may vary to a great extent, for example from 1 dtex to 5 dtex or more, by adjusting the spinning conditions in known manner. By way of example, fibers B-1 and F-1 have a filament linear density of 4.1 dtex and 3.7 dtex, respectively.

These fibers of Table 1 are all used using a process according to the invention.

In particular, the temperature Tc is always greater than 5° C. and the tensile stress $\sigma_c$ is always less than 5 cN/tex, the highest values Ar and Er (for example $Ar \geq 10$ and $Er \geq 20$) generally being obtained for a Tc greater than 10° C. and $\sigma_c$ less than 2 cN/tex.

In all these examples of Table 1, the concentration C lies within a range from 16% to 26%, and the concentration F lies within a range from 8% to 20%. Preferably, the process of the invention is carried out with very high concentrations C, equal to or greater than 22%, which makes it possible, in general, to increase the values of tenacities Te; for such concentrations C it is preferred to operate with F being greater than 10% because, for lower values F, it has been noted that the solutions, which then have a greater viscosity, could be more difficult to spin and could result in particular in lower tenacities (see, for example, tests B-1 to B-3).

On the other hand, the spinning speeds are high, because they are equal for the most part to 100 or 150 m/min.

III-2.2. Fibers of Regenerated Cellulose (Table 2):

5 tests are performed to obtain fibers of cellulose regenerated from cellulose formate, in accordance with the process of the invention and the details given in paragraph II-3 above, from 3 spinning solutions already used for the previous spinning tests (solutions referenced A, F and I).

Table 2 shows both the particular conditions of carrying out the process of the invention, and the properties of the fibers obtained.

The abbreviations and the units used in this Table 2 tire as follows:

Test No.: Number of the test and of the corresponding fiber (referenced A-5 to I-2);

C, F, P, Tf, Ag, Tc, $\sigma_c$: same meaning as for Table I above.

Cs: Sodium hydroxide concentration of the regeneration means (% by weight);

Vr: regeneration speed (in m/min);

TI: linear density of the fiber (in cN/tex);

TE: tenacity of the fiber (in cN/tex);

AR: elongation at break of the fiber (in %);

MI: initial modulus of the fiber (in cN/tex);

ER: energy at break of the fiber (in J/g);

DS: degree of substitution of the cellulose with formate groups, in the regenerated fiber (in %).

TABLE 1

| Test No. | C % | F % | P % | Tf ° C. | Ag mm | Tc ° C. | $\sigma_c$ cN/tex | Vf m/min | Ti tex | Te cN/tex | Ar % | Mi cN/tex | Er J/g | DS % |
|---|---|---|---|---|---|---|---|---|---|---|---|---|---|---|
| A-1 | 22 | 18 | 60 | 48 | 15 | 10 | <5 | 150 | 56 | 31 | 8.3 | 1340 | 18.1 | 32 |
| A-2 | 22 | 18 | 60 | 48 | 20 | 20 | <2 | 150 | 57 | 32 | 10.0 | 1240 | 21.1 | 33 |
| A-3 | 22 | 18 | 60 | 50 | 25 | 20 | <2 | 150 | 56 | 32 | 10.8 | 1210 | 23.1 | 32 |
| A-4 | 22 | 18 | 60 | 50 | 30 | 20 | <2 | 150 | 56 | 33 | 10.9 | 1230 | 23.6 | 32 |
| B-1 | 24 | 8 | 68 | 56 | 20 | 10 | <5 | 100 | 102 | 22 | 8.6 | 1045 | 12.7 | 23 |
| B-2 | 24 | 8 | 68 | 44 | 30 | 20 | <5 | 100 | 53 | 28 | 8.9 | 1340 | 17.7 | 22 |
| B-3 | 24 | 8 | 68 | 44 | 30 | 30 | <5 | 100 | 53 | 26 | 8.8 | 1260 | 16.1 | 23 |
| C-1 | 24 | 17 | 59 | 45 | 10 | 22 | <5 | 50 | 60 | 30 | 9.4 | 1270 | 23.0 | 28 |
| C-2 | 24 | 17 | 59 | 45 | 15 | 22 | <5 | 50 | 59 | 29 | 9.9 | 1230 | 19.7 | 29 |
| C-3 | 24 | 17 | 59 | 45 | 30 | 22 | <5 | 50 | 56 | 32 | 9.6 | 1315 | 20.5 | 28 |
| D-1 | 24 | 17 | 59 | 50 | 20 | 7 | <5 | 150 | 53 | 34 | 8.7 | 1355 | 19.3 | 29 |
| D-2 | 24 | 17 | 59 | 50 | 20 | 7 | <5 | 100 | 80 | 31 | 10.5 | 1165 | 20.7 | 29 |
| E-1 | 26 | 16 | 58 | 54 | 25 | 20 | <5 | 150 | 51 | 31 | 8.8 | 1280 | 18.5 | 25 |
| E-2 | 26 | 16 | 58 | 54 | 25 | 20 | <5 | 150 | 51 | 31 | 8.9 | 1270 | 18.6 | 26 |
| E-3 | 26 | 16 | 58 | 54 | 25 | 20 | <5 | 150 | 52 | 26 | 8.8 | 990 | 15.4 | 25 |
| F-1 | 24 | 17 | 59 | 50 | 10 | 11 | <5 | 50 | 93 | 27 | 9.2 | 1150 | 16.7 | 29 |
| F-2 | 24 | 17 | 59 | 50 | 10 | 20 | <2 | 50 | 69 | 27 | 12.0 | 1065 | 21.8 | 30 |
| F-3 | 24 | 17 | 59 | 50 | 10 | 20 | <2 | 50 | 57 | 27 | 11.9 | 1020 | 21.7 | 29 |
| G-1 | 24 | 17 | 59 | 43 | 5 | 20 | <5 | 50 | 55 | 24 | 8.2 | 1100 | 14.1 | 29 |
| G-2 | 24 | 17 | 59 | 43 | 10 | 20 | <2 | 50 | 55 | 26 | 10.0 | 1060 | 18.2 | 28 |
| G-3 | 24 | 17 | 59 | 43 | 15 | 20 | <2 | 50 | 55 | 26 | 10.9 | 1015 | 19.5 | 29 |
| H-1 | 22 | 18 | 60 | 48 | 20 | 10 | <5 | 150 | 55 | 32 | 8.0 | 1325 | 17.2 | 33 |
| H-2 | 22 | 18 | 60 | 48 | 20 | 20 | <5 | 150 | 55 | 31 | 10.3 | 1190 | 21.7 | 32 |
| I-1 | 22 | 18 | 60 | 46 | 20 | 20 | <5 | 150 | 54 | 32 | 8.4 | 1395 | 18.6 | 32 |
| J-1 | 16 | 19 | 65 | 40 | 20 | 18 | <5 | 50 | 44 | 26 | 8.0 | 1025 | 13.0 | 42 |
| J-2 | 16 | 19 | 65 | 40 | 20 | 25 | <5 | 50 | 44 | 24 | 8.1 | 990 | 13.0 | 43 |
| K-1 | 22 | 17 | 61 | 46 | 30 | 21 | <5 | 150 | 54 | 32 | 8.5 | 1335 | 18.2 | 32 |

To perform these tests, in particular the special conditions below are used:

stages a) to e) of the spinning process of the invention are used, and the formate fibers emerging from the spinning line, washed but not dried, are regenerated in line and continuously (Vr equal to Vf);

these initial cellulose formate fibers, a sample (several hundred meters) of which was systematically taken on emerging from the spinning line, then dried to measure the mechanical properties, are all in accordance with the invention, their elongation at break Ar, in particular, being at least 8%;

then the formate fiber is treated by passing across regeneration means, washing means and then drying means, the tensile stress or to which the fiber is subjected at the entrance to each of these different means being in all cases less than 5 cN/tex, preferably less than 2 cN/tex;

the regenerating medium, used at ambient temperature (about 20° C.), is an aqueous solution of sodium hydroxide, the sodium 3hydroxide concentration Cs of which varies from 5% to 30% depending on the tests;

the regeneration, washing and drying means are formed by booths equipped with motorized cylinders on which the fiber to be treated is wound;

the fiber is washed with industrial water at a temperature close to 15° C.;

the fiber thus washed is dried by passing over heating cylinders at a temperature of 180° C.;

the dwell times in the regeneration means are of the order of 15 seconds, as in the washing means, while they are of the order of 10 seconds in the drying means;

on emerging from the drying means, the fibers have a residual moisture content of between 12% and 15% (% by weight of dry fiber).

All the mechanical properties indicated in Table 2, like Table 1, are average values calculated over 10 measurements, with the exception of the linear density (average of 3 measurements), the standard deviation over the average (in % of this average) being generally between 1 and 2.5%.

On reading Table 2, it will be noted that all the fibers satisfy the following relationships:

0<DS<2; AR≧8; TE<45; MI>500; ER>10.

It will furthermore be noted that these regenerated cellulose fibers for the most part satisfy all the following preferred relationships:

TE>30; MI>1200; ER>15.

In the fibers of the invention of liquid-crystal origin, whether they be of cellulose formate or of cellulose regenerated from this formate, the filaments have, under an optical polarizing microscope, a banded structure typical of their liquid-crystal origin.

Such a banded structure (or "pleated structure") has been described, for example, for filaments of aramid fibers, which have also originated in known manner from liquid-crystal solutions, in the following documents: Journal of Polymer Science—Polymer Physics Edition—18, 871–876 (1980); Journal of Applied Polymer Science—Applied Polymer Symposium—41, 269–292 (1985).

TABLE 2

| Test No. | C % | F % | P % | Tf °C. | Ag mm | Tc °C. | $\sigma_c$ cN/tex | Cs % | Vr m/min | TI tex | TC cN/tex | AR % | MI cN/tex | ER J/g | DS % |
|---|---|---|---|---|---|---|---|---|---|---|---|---|---|---|---|
| A-5 | 22 | 18 | 60 | 50 | 25 | 20 | <2 | 8 | 150 | 51 | 33 | 8.4 | 850 | 16.0 | 1.1 |
| A-6 | 22 | 18 | 60 | 50 | 30 | 20 | <2 | 30 | 150 | 49 | 34 | 8.6 | 1210 | 18.5 | 0.4 |
| A-7 | 22 | 18 | 60 | 48 | 30 | 21 | <2 | 30 | 150 | 48 | 35 | 8.3 | 1380 | 18.7 | 0.2 |
| F-4 | 24 | 17 | 59 | 45 | 12 | 11 | <5 | 5 | 50 | 50 | 32 | 8.1 | 1320 | 16.6 | 0.1 |
| I-2 | 22 | 18 | 60 | 50 | 30 | 23 | <5 | 30 | 150 | 53 | 34 | 8.0 | 1555 | 18.1 | 0.3 |

This particular structure, which is set during formation of the filament (i.e., during coagulation), is to some extent a photograph of the state of relaxation, which is more or less marked depending on the elasticity of the liquid-crystal solution, towards which this solution evolves upon emerging from the elongation fields developed in the spinneret and in the air gap.

Such a banded structure cannot be seen, under an optical polarizing microscope, on fibers of cellulose formate resulting from an isotropic (i.e., non-liquid-crystal) spinning solution.

Although it may also not be visible on cellulose formate fibers of liquid-crystal origin (absence of relaxation or too little relaxation of the solution), this particular structure, when present, is a certain indication of liquid-crystal origin for this type of solution.

Unexpectedly, it has been noted that the fibers of the invention having an elongation at break of at least 8% all show this banded structure under an optical polarizing microscope, whereas such a structure is not generally visible under an optical polarizing microscope on fibers which have been coagulated in acetone in accordance with the teaching of the above mentioned application WO 85/05115, these fibers having low values of elongation at break.

III-2. Fibers Not in Accordance with the Invention (Table 3)

A total of 11 spinning tests, not in accordance with the invention, are performed, two of these tests (F-5 and F-6) being followed continuously by direct treatment on the regeneration line (Cs=30%) used for the tests of Table 2 above.

All the fibers obtained are therefore cellulose formate fibers, with the exception of fibers F-5 and F-6, which are of regenerated cellulose (DS less than 2%).

These 11 fibers are obtained from 7 different spinning solutions already used for the preceding tests (solutions referenced A to D, F, H to J).

Table 3 shows both the particular conditions of embodiment and the properties of the fibers obtained. The abbreviations and units are the same as for Table I above, except for the fact that the symbols Ti, Te, Ar, Mi and Er correspond to the mechanical properties of a regenerated cellulose fiber for tests F-5 and F-6.

For carrying out these tests, spinning processes and if applicable regeneration processes according to those of the invention are used, with the exception of one of the following two particular conditions: the temperature Tc is not greater than 5° C. or the stress $\sigma_c$ is greater than 5 cN/tex.

TABLE 3

| Test No. | C % | F % | P % | Tf °C. | Ag mm | Tc °C. | $\sigma_c$ cN/tex | Vf m/min | Ti tex | Te cN/tex | Ar % | Mi cN/tex | Er J/g | DS % |
|---|---|---|---|---|---|---|---|---|---|---|---|---|---|---|
| A-8 | 22 | 18 | 60 | 48 | 15 | 1 | <5 | 150 | 56 | 31 | 6.2 | 1380 | 13.5 | 33 |
| B-4 | 24 | 8 | 68 | 52 | 20 | 1 | <5 | 150 | 53 | 27 | 6.1 | 1400 | 11.2 | 22 |
| B-5 | 24 | 8 | 68 | 56 | 20 | 5 | <5 | 100 | 102 | 23 | 7.0 | 1140 | 10.8 | 23 |
| C-4 | 24 | 17 | 59 | 45 | 40 | 22 | >5 | 50 | 58 | 32 | 6.9 | 1510 | 15.5 | 29 |
| C-5 | 24 | 17 | 59 | 45 | 50 | 22 | >5 | 50 | 58 | 30 | 6.2 | 1480 | 13.0 | 28 |
| D-3 | 24 | 17 | 59 | 50 | 30 | 1 | <5 | 150 | 51 | 34 | 6.8 | 1480 | 15.2 | 28 |
| F-5 | 24 | 17 | 59 | 50 | 45 | 11 | >5 | 50 | 49 | 31 | 7.5 | 1280 | 15.3 | 0.2 |
| F-6 | 24 | 17 | 59 | 50 | 55 | 11 | >5 | 50 | 49 | 32 | 7.1 | 1370 | 14.8 | 0.3 |
| H-3 | 22 | 18 | 60 | 48 | 20 | 2 | <5 | 150 | 55 | 32 | 6.4 | 1370 | 13.7 | 33 |
| I-3 | 22 | 18 | 60 | 46 | 45 | 20 | >5 | 150 | 54 | 31 | 7.7 | 1380 | 16.5 | 33 |
| J-3 | 16 | 19 | 65 | 45 | 15 | 2 | <5 | 50 | 44 | 28 | 7.1 | 1060 | 13.3 | 42 |

It will be noted that these fibers, despite advantageous properties of tenacity or in particular of initial modulus, are not in accordance with the invention, since none of them has in particular an elongation at break of at least 8%.

Furthermore, the majority of these fibers of Table 3 do not have a banded structure as described previously for the fibers according to the invention under an optical polarizing microscope. It has been noted in particular that the use of high tensile stresses $\sigma_c$ or $\sigma_c$ during spinning and/or regeneration, for example of the order of 5–10 cN/tex or more, involving a drop in the elongation at break (Ar or AR) below 8%, was most frequently accompanied by the disappearance of the banded structure. This phenomenon is probably due to the fact that excessively high tensions may block relaxation of the solution during coagulation or, when the banded structure is present on a formate fiber, involve "unpleating" of the latter during the regeneration, thus causing it to disappear.

In conclusion, the fibers of the invention are characterized by a combination of properties which is novel and unexpected for fibers based on cellulose formate of liquid-crystal origin: elongation at break of at least 8%, tenacity equal to or greater than, and initial modulus substantially greater than, that of a conventional viscose fiber. The fibers of the invention, compared with these viscose fibers, furthermore have the advantage of being produced using a non-polluting process, at high spinning speeds.

Of course, the invention is not limited to the examples described previously.

Thus, for example, different constituents may possibly be added to the base constituents previously described (cellulose, formic acid, phosphoric acids, coagulating water), without changing the spirit of the invention. The additional constituents, preferably ones which are chemically non-reactive with the base constituents, may, for example, be plasticisers, sizes, dyes, polymers other than cellulose which are possibly capable of being esterified during the production of the solution; these may also be products making it possible, for example, to improve the spinnability of the spinning solutions or the use properties of the fibers obtained.

The expression "cellulose formate" as used in this document covers cases in which the hydroxyl groups of the cellulose are substituted by groups other than formate groups in addition to the latter, for instance ester groups, particularly acetate groups, the degree of substitution of the cellulose with these other groups being preferably less than 10%.

Finally, the expressions "spinning" or "fibers" must be taken in a very broad sense, these expression also covering films obtained from liquid-crystal solutions of cellulose formate.

We claim:

1. A process for spinning a liquid-crystal solution of cellulose formate to obtain a cellulose formate fiber having the following properties:
    a) filaments of the fiber exhibit a banded structure under an optical polarizing microscope, wherein such structure is characteristic of a liquid—crystal origin, and
    b) the fiber satisfies the following relationships:
        DS≧2; Ar≧8; Te<45; Mi>500; Er>10, wherein DS is the degree of substitution of the cellulose with formate groups in the fiber (in %), Ar is the elongation at break (in %) of the fiber, Te is the tenacity of the fiber (in cN/tex), Mi is the initial modulus of the fiber (in cN/tex) and Er is the energy of the fiber at break (in J/g),
    the process comprising:
        (i) extruding a solution of cellulose formate in phosphoric acid, said solution being optically anisotropic at ambient temperature and at rest, through a spinneret at a temperature (Tf), whereby the solution is optically anisotropic if at rest,
        (ii) stretching the extruded solution through a non-coagulating layer,
        (iii) coagulating the stretched solution in water at a temperature (Tc) greater than 5° C. to form a fiber, wherein the tensile stress ($\sigma_c$) to which the fiber is subjected after coagulation is less than 5 cN/tex, and
        (iv) washing the fiber.

2. The process according to claim 1, in which the cellulose concentration (C) of the solution ranges from 16% to 26%, and the total formic acid concentration (F) of the solution ranges from 8% to 20% (% by weight on the basis of a non-esterified cellulose).

3. The process according to claim 1, in which at least one of the following characteristics is satisfied:
    Tf ranges from 40° C. to 60° C.;
    Tc is greater than 10° C.;
    $\sigma_c$ is less than 2 cN/tex;
    the thickness Ag of the non-coagulating layer ranges from 5 to 35 mm.

4. The process according to claim 1, in which the coagulation water does not contain an additive.

5. A process for obtaining a regenerated fiber having the following properties:
    a) under an optical polarizing microscope, filaments of the fiber have a banded structure typical of their liquid-crystal origin;
    b) it satisfies the following relationships:
        0<DS<2; AR≧8; TE<45; MI>500; ER>10, wherein DS is the degree of substitution of the cellulose with formate groups in the fiber (in %), AR is the elongation at break (in %) of the fiber, TE is its tenacity (in cN/tex), MI is its initial modulus (in cN/tex) and ER is its energy at break (in J/g);

said process comprising:

(a) regenerating a cellulose formate fiber having the following properties:

(i) filaments of the fiber exhibit a band structure under an optical polarizing microscope, wherein such structure is characteristic of a liquid crystal origin, and (ii) the fiber satisfies the following relationships: $DS \geq 2$; $Ar \geq 8$; $Te<45$; $Mi>500$; $Er>10$, wherein DS is the degree of substitution of the cellulose with formate groups in the fiber (in %, Ar is the elongation at break (in %) of the fiber, Te is the tenacity of the fiber (in cN/tex), Mi is the initial modulus of the fiber (in cN/tex) and Er is the energy of the fiber at break (in J/g), (b) washing and drying the regenerated fiber, wherein the tensile stress ($\sigma_r$) to which the fiber is subjected prior to regenerating, washing and drying is less than 5 cN/tex.

6. A process according to claim 5, in which an aqueous sodium hydroxide solution is used, the concentration of which is at most equal to 5% or at least equal to 16% (% by weight).

7. The process according to claim 1, wherein the non-coagulating layer is air.

8. The process according to claim 1, further comprising drying the washed fiber.

9. The process according to claim 1, in which the coagulation water contains a surfactant.

10. The process according to claim 5, wherein the tensile stress ($\sigma_r$) is less than 2 cN/tex.

* * * * *

UNITED STATES PATENT AND TRADEMARK OFFICE
CERTIFICATE OF CORRECTION

PATENT NO. : 6,527,997 B1
DATED : March 4, 2003
INVENTOR(S) : Meraldi et al.

It is certified that error appears in the above-identified patent and that said Letters Patent is hereby corrected as shown below:

Title page, Item [54] and Column 1, line 2,
Title, "LIQUID CRYSTAL" should read -- LIQUID-CRYSTAL --

Column 2,
Line 13, "uses-water" should read -- uses water --

Column 3,
Line 58, "'defined" should read -- defined --
Line 65, "a" should read -- an --; "Ubbleohde" should read -- Ubbelhode --; and "viscosimeter" should read -- viscometer --

Column 9,
Line 25, "cc" should read -- $\sigma_c$ --

Column 10,
Line 2, "0. 1%" should read -- 0.1% --

Column 15,
Line 33, "3hydroxide" should read -- hydroxide --

Column 17,
Line 24, "$\sigma_c$" should read -- $\sigma_r$ --

Column 18,
Line 23, "liquid—crystal" should read -- liquid-crystal --

UNITED STATES PATENT AND TRADEMARK OFFICE
CERTIFICATE OF CORRECTION

PATENT NO. : 6,527,997 B1
DATED : March 4, 2003
INVENTOR(S) : Meraldi et al.

It is certified that error appears in the above-identified patent and that said Letters Patent is hereby corrected as shown below:

Column 19,
Line 11, "liquid crystal" should read -- liquid-crystal --
Line 15, "(in %," should read -- (in %), --

Signed and Sealed this

Seventh Day of October, 2003

JAMES E. ROGAN
*Director of the United States Patent and Trademark Office*